United States Patent
Kim et al.

(10) Patent No.: US 10,862,136 B2
(45) Date of Patent: Dec. 8, 2020

(54) SUPPORT FOR FUEL CELL, METHOD OF PREPARING THE SAME, AND ELECTRODE FOR FUEL CELL, MEMBRANE-ELECTRODE ASSEMBY FOR A FUEL CELL AND FUEL CELL SYSTEM INCLUDING SAME

(71) Applicant: KOLON INDUSTRIES, INC., Gwacheon-si (KR)

(72) Inventors: Jun-Young Kim, Yongin-si (KR); Sung-Chul Lee, Yongin-si (KR); Myoung-Ki Min, Yongin-si (KR); Yong-Bum Park, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 722 days.

(21) Appl. No.: 14/069,853

(22) Filed: Nov. 1, 2013

(65) Prior Publication Data
US 2014/0248552 A1 Sep. 4, 2014

(30) Foreign Application Priority Data
Mar. 4, 2013 (KR) .......................... 10-2013-0022990

(51) Int. Cl.
*H01M 4/92* (2006.01)
*H01M 8/1018* (2016.01)

(52) U.S. Cl.
CPC ............ *H01M 4/926* (2013.01); *H01M 4/92* (2013.01); *H01M 4/921* (2013.01); *H01M 2008/1095* (2013.01)

(58) Field of Classification Search
CPC ........ H01M 4/926; H01M 4/92; H01M 4/925; H01M 2008/1095; H01M 4/921
See application file for complete search history.

(56) References Cited

U.S. PATENT DOCUMENTS 8,227,117 B2 7/2012 Hampden-Smith et al.
2004/0121220 A1* 6/2004 Ikoma .................. H01M 4/926
429/480

(Continued)

FOREIGN PATENT DOCUMENTS

JP 2006008472 A 1/2006
JP 2009-226318 10/2009

(Continued)

OTHER PUBLICATIONS

Jha, Neetu, et al."Graphene-multi walled carbon nanotube hybrid electrocatalyst support material for direct methanol fuel cell." international journal of hydrogen energy 36.12 (2011): 7284-7290.*

(Continued)

*Primary Examiner* — Milton I Cano
*Assistant Examiner* — Philip A. Stuckey
(74) *Attorney, Agent, or Firm* — Harvest IP Law, LLP

(57) ABSTRACT

Disclosed are a support for a fuel cell, a method of preparing the same, an electrode containing the same, a membrane-electrode assembly containing the same, and a fuel cell system containing the same. The electrode includes an electrode substrate and a catalyst layer on the electrode substrate, wherein the catalyst layer includes a catalyst and a binder resin. The catalyst includes a support and an active metal supported on the support. The support includes a carbon substrate and a graphitic layer covering a surface of the carbon substrate. The carbon substrate may be a carbon nanotube, a carbon nanowire, or a heat-treated carbon black, and the graphitic layer includes graphene sheets stacked together and has mesopore channels therein aligned with the graphene sheets. The active metal is supported on the graphitic layer.

8 Claims, 11 Drawing Sheets

(56) References Cited

U.S. PATENT DOCUMENTS

| | | | | |
|---|---|---|---|---|
| 2008/0280169 | A1* | 11/2008 | Niu | H01B 1/04 |
| | | | | 429/409 |
| 2010/0304136 | A1* | 12/2010 | Coleman | B82Y 30/00 |
| | | | | 428/366 |
| 2011/0200917 | A1* | 8/2011 | Takahashi | H01M 4/92 |
| | | | | 429/532 |

FOREIGN PATENT DOCUMENTS

| | | |
|---|---|---|
| JP | 2011115760 A | 6/2011 |
| KR | 20070075775 A | 7/2007 |
| KR | 10-0891337 | 3/2009 |
| KR | 10-2011-0070353 A | 6/2011 |

OTHER PUBLICATIONS

Dresselhaus, Mildred S., et al. "Perspectives on carbon nanotubes and graphene Raman spectroscopy." Nano letters 10.3 (2010): 751-758.*

Poochai, Chatwarin, and Thirawudh Pongprayoon. "Gas diffusion layer from multiwalled carbon nanotubes/polyacrylonitrile composite fiber for proton exchange membrane fuel cell." Proceeding of 10th International Conference on Heat Transfer, Thermal Engineering and Environment. Istanbul, Turkey. 2012. (Year: 2012).*

Chakrabarti, K. "Controlled lowering of graphitization temperature of electrospun poly (acrylonitrile) based carbon fiber by carbon nanotube embedment." Materials Letters 64.14 (2010): 1607-1610. (Year: 2010).*

Moravkova et al. Enchanced Thermal Stability of Multi-Walled Carbon Nanotubes, Etc. Elsevier, 97 (2012) 1405-1414.

\* cited by examiner

SUPPORT FOR FUEL CELL, METHOD OF PREPARING THE SAME, AND ELECTRODE FOR FUEL CELL, MEMBRANE-ELECTRODE ASSEMBY FOR A FUEL CELL AND FUEL CELL SYSTEM INCLUDING SAME

CROSS-REFERENCE TO RELATED APPLICATION

Korean Patent Application No. 10-2013-0022990, filed on Mar. 4, 2013, in the Korean Intellectual Property Office, and entitled: "Support for Fuel Cell, Method of Preparing Same, and Electrode For Fuel Cell, Membrane-Electrode Assembly For A Fuel Cell and Fuel Cell System Including the Same," is incorporated by reference herein in its entirety.

BACKGROUND

1. Field

Embodiments relate to a support for a fuel cell, method of preparing the same, an electrode for a fuel cell, a membrane-electrode assembly for a fuel cell including the same, and a fuel cell system including the same.

2. Description of the Related Art

A fuel cell is a power generation system for producing electrical energy through an electrochemical redox reaction of an oxidant and a fuel such as hydrogen or a hydrocarbon-based material such as methanol, ethanol, natural gas, and the like.

Such a fuel cell is a clean energy source that may replace fossil fuels. A fuel cell may include a stack composed of unit cells, and may produce various ranges of power output. The fuel cell has a four to ten times higher energy density than a small lithium battery and thus, has been high-lighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell which uses methanol as a fuel.

The polymer electrolyte fuel cell has advantages of high energy density and high power, and a direct oxidation fuel cell has lower energy density than that of the polymer electrolyte fuel cell, but has advantages of easy handling of the liquid-type fuel, a low operation temperature, and no need for an additional fuel reforming processor.

In the aforementioned fuel cell system, a stack that substantially generates electricity includes several to scores of unit cells stacked adjacent to one another, and each unit cell is composed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

Electricity is generated as follows. A fuel is supplied to the anode and adsorbed on catalysts of the anode and then, oxidized to produce protons and electrons. The electrons are transferred into the cathode via an external circuit, while the protons are transferred into the cathode through the polymer electrolyte membrane. In addition, an oxidant is supplied to the cathode. Then, the oxidant reacts with the protons and the electrons on the catalysts of the cathode to produce electricity along with water.

SUMMARY

Embodiments are directed to a support for a fuel cell including a substrate including highly crystalline carbon, and a crystalline carbon layer on the substrate.

The crystalline carbon layer may have a thickness of about 1 nm to about 40 nm.

The highly crystalline carbon may have a Raman spectrum intensity ratio between a (1360) plane and a (1580) plane, $I_D/I_G$ $((I(1360\ cm^{-1})/1580\ cm^{-1}))$ of about 0.24 to about 0.91.

The highly crystalline carbon may include carbon nanotube, carbon nanowire, heat-treated carbon black, graphite, graphene, or a combination thereof.

Embodiments are also directed to a method of preparing the support for a fuel cell including adding a monomer for a graphitizable polymer to a highly crystalline carbon liquid to prepare a mixture, adding a polymerization initiator to the mixture to perform polymerization and prepare a polymerization product, stabilizing the polymerization product to prepare a stabilized product, first heat-treating the stabilized product to provide a first heat-treated product, second heat-treating and carbonizing the first heat-treated product to provide a resultant, and third heat-treating and graphitizing the resultant.

The polymerization product may include highly crystalline carbon and a carbon layer. The carbon layer may have a coating ratio represented by the following Equation 1 of about 100% to about 800%:

$$\text{Coating ratio}=[(W_f-W_0)/W_0]\times 100(\%) \qquad [\text{Equation 1}]$$

$W_0$ denotes a weight (g) of highly crystalline carbon in the substrate, and $W_f$ denotes a weight (g) of total polymerization product in the substrate and carbon layer.

The first heat-treating may be performed at about 300° C. to about 700° C.

The stabilizing may be performed at about 220° C. to about 280° C.

The second heat-treating may include a first heating stage at about 400° C. to about 800° C. and second heating stage at about 800° C. to about 1200° C.

The third heat-treating may be performed at about 1200° C. to about 2500° C.

Embodiments are also directed to an electrode for a fuel cell including an electrode substrate, and a catalyst layer on the electrode substrate, the catalyst layer including the support as disclosed above and an active metal supported on the support.

The active metal may include platinum, ruthenium, osmium, a platinum-ruthenium alloy, a platinum-osmium alloy, a platinum-palladium alloy, or a platinum-M alloy, wherein M is at least one transition element selected from Ga, Ti, V, Cr, Mn, Fe, Co, Ni, Cu, Zn, Sn, Mo, W, Rh, and Ru.

Embodiments are also directed to a membrane-electrode assembly for a fuel cell including a cathode and an anode facing each other and a polymer electrolyte membrane between the cathode and anode. At least one of the cathode and anode may be the electrode disclosed above.

Embodiments are also directed to fuel cell system including at least one electricity generating element including the membrane-electrode assembly disclosed above and a separator positioned at each side of the membrane-electrode assembly, a fuel supplier that supplies the electricity generating element with a fuel, and an oxidant supplier that supplies the electricity generating element with an oxidant.

BRIEF DESCRIPTION OF THE DRAWINGS

Features will become apparent to those of skill in the art by describing in detail exemplary embodiments with reference to the attached drawings in which:

FIG. 7B is a graph showing XPS Pt4f core-level spectra of the catalyst obtained from Example 3 (b).

DETAILED DESCRIPTION

Figure 1:
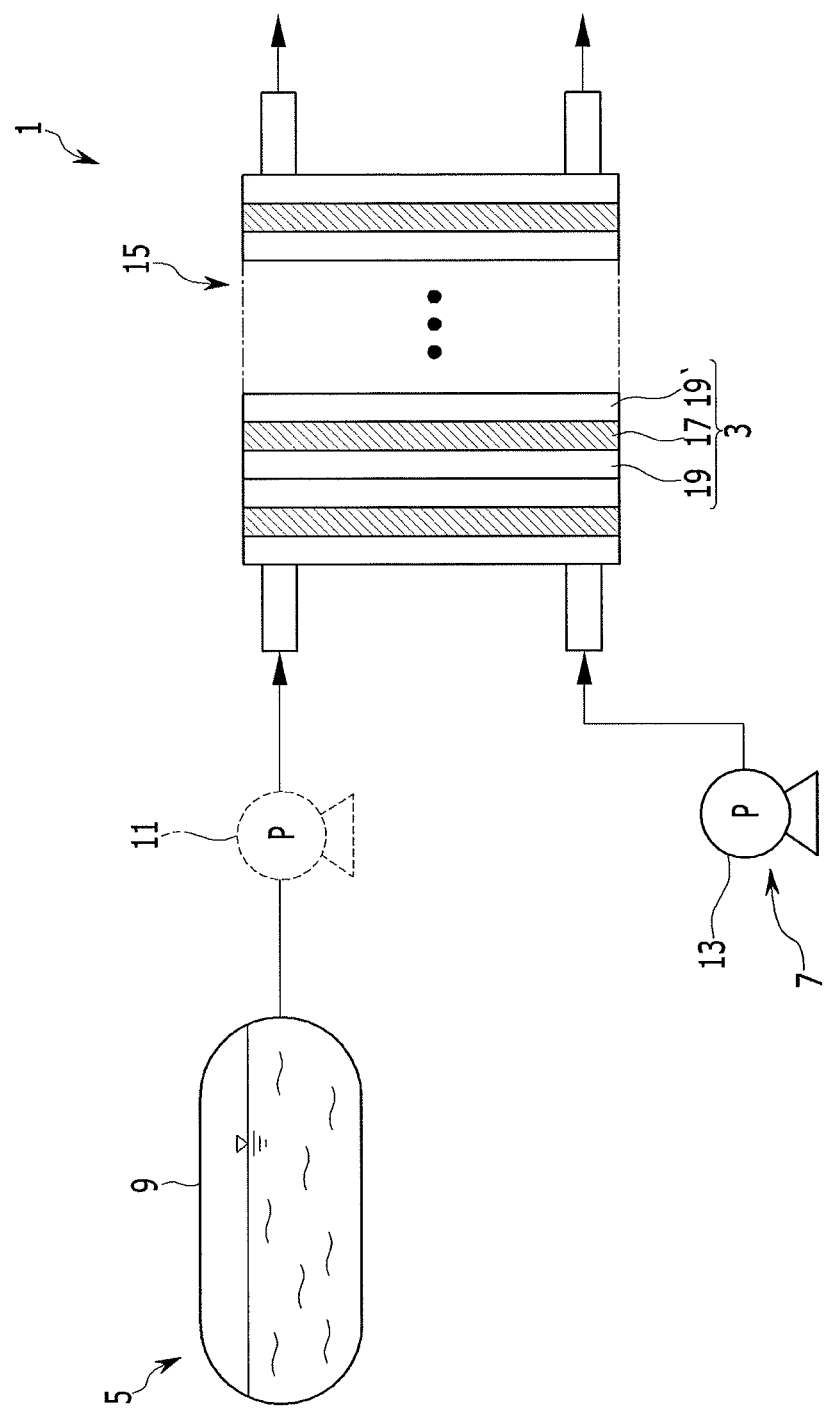
FIG. 1 illustrates a schematic view showing a fuel cell system according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

One embodiment provides a support for a fuel cell that includes a substrate including highly crystalline carbon and a crystalline carbon layer disposed on the substrate.

The highly crystalline carbon may be carbon nanotube, carbon nanowire, heat-treated carbon black, graphite, graphene, or a combination thereof.

If heat-treated carbon black is used, the heat-treated carbon black may be prepared by heat-treating the carbon black at about 1000° C. to about 2500° C. for about 30 minutes to about 1 hour. The heat treatment atmosphere may be $N_2$, Ar, or a combination thereof. The heat treatment may be performed at a heat-up rate of about 1° C./min to about 6° C./min. When the heat treatment is performed with a rising temperature, the heat treatment may be performed in 3 steps from the low temperature to the high temperature. In this case, the heat-up rate may be changed in each step so that the heat-up rate is decreased as increasing the temperature.

The thickness of the substrate including highly crystalline carbon and the crystalline carbon layer may be appropriately adjusted according to the kind of carbon that is used. According to an implementation, the crystalline carbon layer may have a thickness of about 1 nm to about 40 nm.

In one embodiment, the highly crystalline carbon may have a Raman spectrum intensity ratio between a (1360) plane and a (1580) plane, $I_D/I_G$ (($I(1360\ cm^{-1})/I(1580\ cm^{-1})$)) of about 0.24 to about 0.91. When the highly crystalline carbon has the Raman spectrum intensity ratio within this range, the high crystalline and the high graphitization degree may be obtained, so as to provide advantages of low carbon oxidation rate.

In one embodiment, the highly crystalline carbon may have an interlayer spacing (d002) of a (002) plane of 3.35 Å to 3.55 Å.

The support according to one embodiment has a structure that includes a highly crystalline carbon substrate and a crystalline carbon layer disposed on the substrate. Such a structure may have improved durability. The crystalline carbon layer may be formed from the graphitizable polymer, and a functionalized carbon structure having a high graphitization degree may be formed while crystallizing the graphitizable polymer. Accordingly, resistance to oxidation corrosion may be improved if the functionalized carbon has a high crystallinity. In addition, the support according to one embodiment may effectively suppress the support corrosion if fewer defects are present on the surface of support, and the support may have improved stability due to the high resistance. As the gaps between π bond of the functional carbon acts as an anchoring center, the adherence between the support and the catalyst may be increased, and the support aggregation may be suppressed. In addition, the stable structure and the anchoring site of the functionalized carbon may suppress the phenomenon that the catalyst is aggregated or detached from the support, so as to prevent or reduce catalyst corrosion.

Generally, a Pt/C catalyst supporting Pt nanoparticle in the carbon support is widely used as a catalyst for a fuel cell, but the electrochemical surface area (ECSA) of Pt is shapely decreased by the phenomenon of carbon support corrosion, Pt nanoparticle decomposition, Ostwald ripening, and aggregation. As a result, the durability of the catalyst may remarkably deteriorate.

According to an embodiment, the support may have improved durability, such that deterioration may be prevented or hindered.

Another embodiment provides a method of preparing the support for a fuel cell. The method includes adding a monomer for a graphitizable polymer to a highly crystalline carbon liquid (for example, a highly crystalline carbon dissolved or suspended in a liquid) to prepare a mixture, adding a polymerization initiator to the mixture to perform polymerization and prepare a polymerization product, stabilizing the polymerization product to prepare a stabilized product, first heat-treating the stabilized product, second heat-treating and carbonizing the first heat-treated product, and third heat-treating and graphitizing the resultant. Hereinafter, a method of preparing the support for a fuel cell according to one embodiment is described in detail.

First, a precursor for forming a graphitizable polymer is added to the highly crystalline carbon liquid.

The highly crystalline carbon liquid may be prepared by adding a highly crystalline carbon in a solvent. The carbon liquid may be a carbon suspension. After adding the highly crystalline carbon into the solvent, the ultrasonic wave treatment may be carried out. The ultrasonic wave treatment may be performed for about 5 minutes to about 60 minutes.

The highly crystalline carbon may be added to the solvent in an amount of about 1 wt % to about 70 wt % based on 100 percent by weight of the solvent.

The highly crystalline carbon may be carbon nanotube, carbon nanowire, heat-treated carbon black, graphite, graphene, or a combination thereof.

The precursor for forming a graphitizable polymer may be a diarylacetylene derivative, an alkyl derivative, an alkoxy derivative (benzophenone, phosphate), a 1,6-heptadiene-based compound, a dihalohetero compound, an ethynyl compound or a combination thereof. According to an implementation, the precursor be any precursor being capable of forming of a polymer of polyacrylonitrile, polycaprolactone, polyvinylene, polynaphthalene, polyimide, polyketone, polyarylene derivative, polyarylene-vinylene or a combination thereof.

A polymerization initiator may be added to the mixture to be polymerized. The polymerization initiator may be ammonium persulfate $((NH_4)_2S_2O_8)$, potassium persulfate $(K_2S_2O_8)$, azobisisobutyronitrile $(C_8H_{12}N_4)$, or a combination thereof, as examples. The polymerization initiator may be added in a suitable amount for initiating the polymerization reaction of the monomer for a graphitizable polymer.

The polymerization may be performed by agitating under an atmosphere of nitrogen, argon, or a combination thereof at a temperature of about 0° C. to about 70° C. for about 1 hour to about 48 hours.

The polymerization product may be cleaned according to a general washing process. In addition, the polymerization product may be vacuum-dried at about 60° C. to about 120° C.

The polymerization product includes highly crystalline carbon and a carbon layer. The carbon layer may be formed on the highly crystalline carbon. The carbon layer may have a coating ratio represented by the following Equation 1 of about 100% to about 800%. In an implementation, the carbon layer may have a coating ratio of about 110% to about 800%.

Coating ratio=$[(W_f-W_0)/W_0] \times 100(\%)$  [Equation 1]

($W_0$: weight (g) of highly crystalline carbon in the substrate, and $W_f$: weight (g) of total polymerization product including the substrate and a crystalline carbon layer)

When the coating ratio of carbon layer is within this range, the carbon layer may be uniformly coated on the substrate including the highly crystalline carbon, and the highly crystalline graphitic layer structure may be easily formed without deteriorating the characteristics of high crystalline carbon.

Then, the substrate coated with graphitizable polymer may be stabilized. The stabilizing may include a chemical reaction such as crosslinking, oxidation, aromatization, dehydrogenation, or cyclization of graphitizable polymer.

The stabilizing may be performed with a rising temperature at a heat-up rate of about 3° C./min to about 5° C./min under the air atmosphere to a final temperature of about 220° C. to about 280° C. and then continuing at the final temperature for about 30 minutes to about 2 hours.

According to the stabilizing process, the graphitizable polymer may adsorb oxygen from the air as part of the cycling and the cross-linking linkage, so as to provide a thermally stable ladder polymer structure in the following carbonizing process according to the reaction. If the temperature of the stabilizing process is lower than the range, the reaction may occur too slowly, and the stabilization may be incompletely performed, so as to deteriorate the carbon physical properties. On the other hand, if the temperature of the stabilization process is higher than the range, the graphitizable polymer may be excessively heated to be melted or combusted, which is unfavorable.

Then, the stabilized substrate may be subjected to a first heat-treating process. The first heat-treating process may be performed under a $N_2$ or Ar atmosphere at a heat-up rate of about 3° C./min to about 5° C./min and maintained at about 300° C. to about 700° C. for about 30 minutes to about 6 hours. According to the first heat-treating process, the carbon content may be increased to be greater than or equal to about 90 wt % by exhausting various gases, or a three dimensional carbon structure having molecular and fibrillar orientation may be formed. In addition, the polymer chain may be rearranged according to the first heat-treatment so that the parallel molecular chain may form a three dimensional bond. In addition, the effects according to the first heat-treating process may be further effectively obtained when the heat-treatment is performed under the above-mentioned conditions.

Then, the first heat-treated substrate may be subjected to a second heat-treating process to be carbonized. According to the carbonizing process, the polymer coated on the substrate may be carbonized. The second heat-treating process includes a first step of heating at about 400° C. to about 800° C. and a second step of heating at about 800° C. to about 1200° C. When the second heat-treating process is performed in the first and the second steps within the temperature range, structures such as graphite oxide may be removed, and carbon with an $sp^2$ structure may be developed.

The substrate that has undergone the carbonizing process may be subjected to a third heat-treating process to be graphitized. According to the graphitization, the carbonized polymer is finally graphitized to provide graphite, which is a crystalline carbon layer, on the substrate. The third heat-treating process may be performed by heating at about 1200° C. to about 2500° C.

When performing a third heat-treating process, the formed graphitic layer structure may be further developed and arranged, and graphene sheets may be stacked together well. Accordingly, a uniform graphitic layer may be provided that may slow the kinetics of carbon oxidation to improve the anti-corrosion properties of carbon. The high temperature graphitization process may remove an amorphous phase to enhance the graphitized structure arrangement, so that a mesoporous channel aligned with graphene layers may be well developed.

When third heat-treatment is performed within the temperature range, the effects of the third heat-treatment may be more effectively obtained, and mesopore channels aligned together with the arranged graphitized structure may be more readily formed and may be well developed.

Another embodiment provides a catalyst for a fuel cell including the support and an active metal supported on the support.

The active metal may be platinum, ruthenium, osmium, a platinum-ruthenium alloy, a platinum-osmium alloy, a platinum-palladium alloy, a platinum-M alloy (M is at least one transition element selected from Ga, Ti, V, Cr, Mn, Fe, Co, Ni, Cu, Zn, Sn, Mo, W, Rh, and Ru), or a combination thereof. The catalyst according to one embodiment may be used in an anode and/or a cathode. The anode and cathode may include the same catalyst. In an implementation, a direct oxidation fuel cell may include a platinum-ruthenium alloy catalyst as an anode catalyst in order to prevent catalyst poisoning in the anode reaction. Specific examples of the catalyst may include one selected from Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The process of supporting the active metal in a support ma be carried out by any suitable process.

Yet another embodiment provides an electrode for a fuel cell including a catalyst layer including the catalyst and an electrode substrate.

The catalyst layer may further include a binder resin to improve its adherence and proton transfer properties.

The binder resin may be a proton conductive polymer resin. Examples of the binder resin may include a polymer resin having a cation exchange group selected from a sulfonic acid group, a carboxylic acid group, a phosphoric acid group, a phosphonic acid group, and derivatives thereof at its side chain. Examples of the polymer resin may include at least one proton conductive polymer selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer.

The hydrogen (H) in the cation exchange group of the proton conductive polymer may be substituted with Na, K, Li, Cs, or tetrabutylammonium. When the H in the cation exchange group of the terminal end of the proton conductive polymer side chain is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used.

The binder resin may be used singularly or in combination. The binder resin may be used along with non-conductive polymers to improve adherence with a polymer electrolyte membrane. The binder resin may be used in a controlled amount.

Examples of the non-conductive polymers include at least one selected from polytetrafluoroethylene (PTFE), tetrafluoroethylene-hexafluoropropylene copolymer (FEP), tetrafluoroethylene-perfluoroalkylvinylether copolymer (PFA), ethylene/tetrafluoroethylene (ETFE), ethylenechlorotrifluoro-ethylene copolymer (ECTFE), polyvinylidenefluoride, a polyvinylidenefluoride-hexafluoropropylene copolymer (PVdF-HFP), dodecylbenzenesulfonic acid, and sorbitol.

The electrode substrate plays a role of supporting an electrode and diffusing a fuel and an oxidant into a catalyst layer, so that the fuel and the oxidant may easily approach the catalyst layer. The electrode substrates may be formed from a material such as carbon paper, carbon cloth, carbon felt, or a metal cloth (a porous film composed of metal fiber or a metal film disposed on a surface of a cloth composed of polymer fibers), as examples.

The electrode substrates may be treated with a fluorine-based resin to be water-repellent to prevent deterioration of diffusion efficiency due to water generated during operation of a fuel cell. The fluorine-based resin may be one selected from polytetrafluoroethylene, polyvinylidene fluoride, polyhexafluoropropylene, polyperfluoroalkylvinylether, polyperfluorosulfonylfluoride alkoxyvinyl ether, fluorinated ethylene propylene, polychlorotrifluoroethylene, and a copolymer thereof.

In order to increase reactant diffusion effects between the electrode substrates and catalyst layer, the anode or cathode may further include a microporous layer on an electrode substrate. The microporous layer may include conductive powders with a certain particle diameter. The conductive material may include, but is not limited to, carbon powder, carbon black, acetylene black, activated carbon, a carbon fiber, fullerene, carbon nanotubes, carbon nanowires, carbon nanohorns, carbon nanorings, or combinations thereof.

The microporous layer is formed by coating a composition including a conductive powder, a binder resin, and a solvent on the conductive substrate. The binder resin may include, for example, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, or a copolymer thereof. The solvent may include, for example, an alcohol such as ethanol, isopropyl alcohol, n-propyl alcohol, butanol, etc., water, dimethyl acetamide, dimethyl sulfoxide, N-methylpyrrolidone, or tetrahydrofuran. The coating method may include, for example, screen printing, spray coating, doctor blade methods, gravure coating, dip coating, silk screening, painting, etc., depending on the viscosity of the composition.

According to another embodiment, a membrane-electrode assembly for a fuel cell including the electrode as either one of a cathode or an anode is provided. The membrane-electrode assembly for a fuel cell includes a cathode and an anode facing each other, and a polymer electrolyte membrane interposed between the cathode and anode.

The polymer electrolyte membrane may be any generally-used polymer electrolyte membrane made of a proton conductive polymer resin. The proton conductive polymer resin may be a polymer resin having a cation exchange group selected from a sulfonic acid group, a carboxylic acid group, a phosphoric acid group, a phosphonic acid group, and derivatives thereof, at its side chain.

Examples of the polymer resin include at least one selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer. According to implementations, the polymer resin may include poly(perfluorosulfonic acid) (commercially available as "NAFION"), poly(perfluorocarboxylic acid), a copolymer of tetrafluoroethylene having a sulfonic acid group and fluorovinylether, defluorinated polyetherketone sulfide, an aryl ketone, or poly[(2,2'-m-phenylene)-5,51-bibenzimidazole].

The hydrogen (H) in the cation exchange group of the proton conductive polymer may be substituted with Na, K, Li, Cs, or tetrabutylammonium. When the H in the cation exchange group of the terminal end of the proton conductive polymer side chain is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Such a Na, K, Li, Cs, or tetrabutylammonium may be converted into a proton during a subsequent acid treatment of a catalyst layer, and thus, a proton form (H$^+$-form) polymer electrolyte membrane may be provided.

Another embodiment provides a fuel cell system including at least one electricity generating element, a fuel supplier, and an oxidant supplier.

The electricity generating element may include the membrane-electrode assembly according to one embodiment and a separator (referred to as a bipolar plate). The electricity generating element may generate electricity through oxidation of a fuel and reduction of an oxidant.

The fuel supplier may supply the electricity generating element with a fuel, while the oxidizing agent supplier may supply the electricity generating element with an oxidizing agent such as oxygen or air.

In an implementation, the fuel may include liquid or gaseous hydrogen or a hydrocarbon fuel. The hydrocarbon fuel, for example, may be methanol, ethanol, propanol, butanol, or natural gas.

FIG. 1 illustrates the schematic structure of a fuel cell system according to an embodiment, which will be described in details with the reference to this accompanying drawing as follows. Although FIG. 1 shows a fuel cell system supplying a fuel and an oxidizing agent to an electrical generating element using a pump, in other implementations, the fuel cell system of the embodiment may include a structure wherein a fuel and an oxidant are provided by diffusion.

A fuel system 1 of the embodiment may include at least one electricity generating element 3 that generates an electrical energy by oxidation of a fuel and reduction of an oxidizing agent, a fuel supplier 5 that supplies the fuel, and an oxidant supplier 7 that supplies an oxidant to the electricity generating element 3.

In addition, the fuel supplier 5 may be equipped with a tank 9, which stores fuel, and a pump 11, which is connected therewith. The fuel pump 11 may supply fuel stored in the tank 9 with a predetermined pumping power.

The oxidant supplier 7, which supplies the electricity generating element 3 with an oxidant, may be equipped with at least one oxidant pump 13 for supplying an oxidant with a predetermined pumping power.

The electricity generating element 3 may include a membrane-electrode assembly 17, which oxidizes hydrogen or a fuel and reduces an oxidant, and separators 19 and 19' that are respectively positioned at opposite sides of the membrane-electrode assembly and that supply hydrogen or a fuel, and an oxidant, respectively. The stack 15 may be provided by stacking at least one of the electricity generating elements 3.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION EXAMPLE 1

2.0 g of a highly crystalline carbon in the form of carbon nanotube was treated with an ultrasonic wave in 20 ml of deionized water for 20 minutes to provide a carbon suspension. 33 ml of acrylonitrile was added to the carbon suspension and agitated for 30 minutes. 1.08 g of ammonium persulfate (($NH_4)_2S_2O_8$) was added thereto, and agitated under the nitrogen atmosphere at 65° C. for 24 hours to provide emulsion polymerization.

After the polymerization, the polymerized product was centrifuged and washed with deionized water and ethanol. Then, the washed product was vacuum-dried at 60° C. to provide a carbon substrate coated with polyacrylonitile (PAN) layer as a support precursor.

PREPARATION EXAMPLE 2

A support precursor, in the form of a carbon substrate coated with a polyacrylonitrile layer, was prepared in accordance with the same procedure as in Preparation Example 1, except that after the 1.08 g of ammonium persulfate (($NH_4)_2S_2O_8$) was added, the agitating under the nitrogen atmosphere at 65° C. was carried out for 1 hour to provide the emulsion polymerization.

PREPARATION EXAMPLE 3

A support precursor, a carbon substrate coated with a polyacrylonitrile layer, was prepared in accordance with the same procedure as in Preparation Example 1, except that after the 1.08 g of ammonium persulfate (($NH_4)_2S_2O_8$) was added, the agitating under the nitrogen atmosphere at 65° C. was carried out for 2 hours to provide the emulsion polymerization.

PREPARATION EXAMPLE 4

A support precursor, a carbon substrate coated with a polyacrylonitrile layer, was prepared in accordance with the same procedure as in Preparation Example 1, except that after the 1.08 g of ammonium persulfate (($NH_4)_2S_2O_8$) was added, the agitating under the nitrogen atmosphere at 65° C. was carried out for 6 hours to provide the emulsion polymerization.

PREPARATION EXAMPLE 5

A support precursor, a carbon substrate coated with a polyacrylonitrile layer, was prepared in accordance with the same procedure as in Preparation Example 1, except that after 1.08 g of ammonium persulfate (($NH_4)_2S_2O_8$) was added, the agitating under the nitrogen atmosphere at 65° C. was carried out for 12 hours to provide the emulsion polymerization.

The coating ratio of polyacrylonitrile layer (carbon layer) of each support precursors obtained from the Preparation Examples 1 to 5 was calculated, and the results are shown in the following Table 1.

|  | Polymerization time (hour) | Coating ratio (%) |
|---|---|---|
| Preparation Example 1 | 24 | 790 |
| Preparation Example 2 | 1 | 135 |
| Preparation Example 3 | 2 | 195 |
| Preparation Example | 6 | 420 |
| Preparation Example 5 | 12 | 680 |

COMPARATIVE EXAMPLE 1

The carbon substrate formed with the PAN coating layer obtained from Preparation Example 1 was stabilized at a heat-up rate of 3° C./min at 280° C. for 1 hour to provide a carbon support coated with a PAN layer.

COMPARATIVE EXAMPLE 2

The carbon substrate formed with the PAN coating layer obtained from Preparation Example 1 was stabilized at a heat-up rate of 3° C./min at 280° C. for 1 hour and subjected to a first heat-treatment under a $N_2$ atmosphere at a heat-up rate of 3° C./min at 400° C. for 2 hours. Then, the first heat-treated product was subjected to a second heat-treatment to provide a carbon support coated with a PAN layer. The second heat-treatment was performed with a first step of heating at 450° C. and second step of heating at 800° C.

EXAMPLE 1

Figure 2:
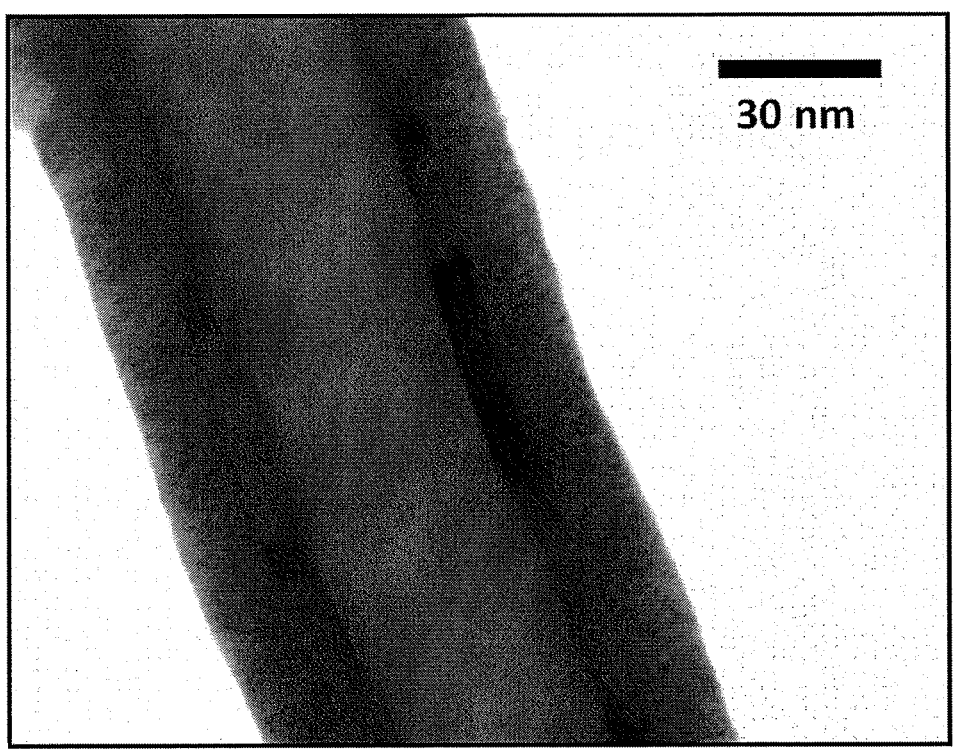
FIG. 2 illustrates a TEM photograph of the support obtained from Example 1.

The carbon substrate formed with a PAN coating layer obtained Preparation Example 1 was stabilized at 280° C. for 1 hour with a heat-up rate of 3° C./min, and the obtained product subjected to a first heat-treatment at a heat-up rate of 3° C./min under an $N_2$ atmosphere at 400° C. for 2 hours, and the first-treated product was subjected to a second heat-treatment. The second heat-treatment was performed with a first step of heating at 450° C. and a second step of heating at 800° C. Then the second heat-treated product was subjected to a third heat-treatment at 2000° C. to provide a carbon support coated with a crystalline carbon layer. FIG. 2 is a TEM photograph of the obtained carbon support coated with a crystalline carbon layer, from which it may be determined that the crystalline carbon layer had a thickness of about 15 nm. The crystalline carbon has an interlayer spacing (d002) of a (002) plane of 3.4 Å.

EXAMPLE 2

A carbon support coated with the crystalline carbon layer was fabricated in accordance with the same procedure as in Example 1, except that the third heat-treatment was performed at 2500° C.

COMPARATIVE EXAMPLE 3

A carbon support coated with a PAN layer was fabricated in accordance with the same procedure as in Comparative Example 2, except that the second step of heating during the second heat-treatment was performed at 1000° C.

Figure 3:
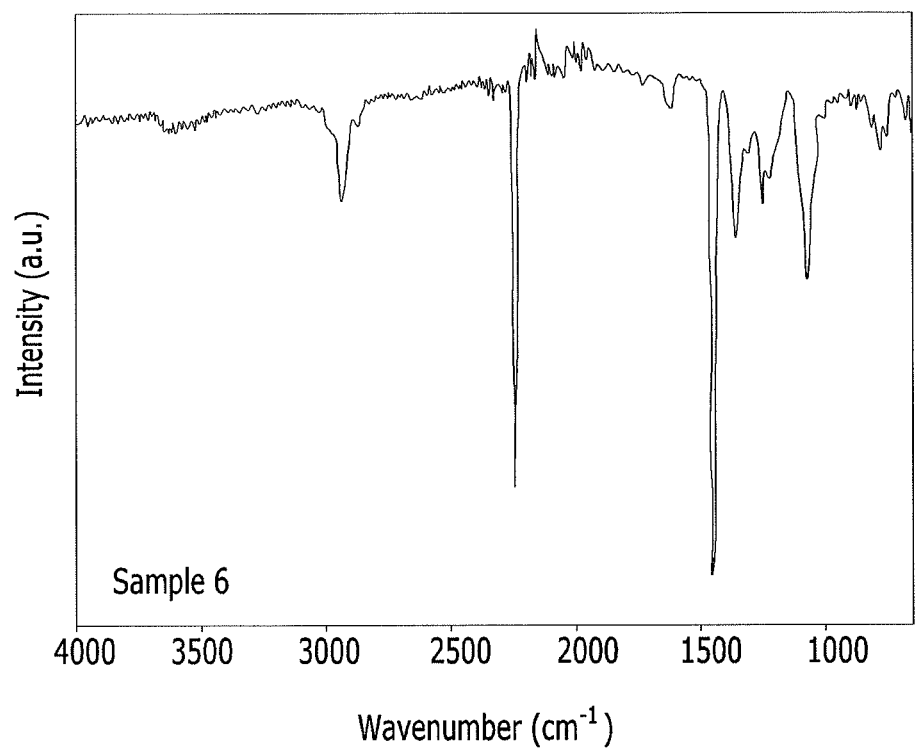
FIG. 3 illustrates a graph showing FT-IR of the support precursor obtained from Preparation Example 1.

The support precursor obtained from Preparation Example 1 was analyzed by FT-IR, and the results are shown in FIG. 3. As shown in FIG. 3, the support precursor obtained from Preparation Example 1 showed a strong peak corresponding to the stretching vibration of a CN group around 2240 cm$^{-1}$. Thereby, it may be determined that the polyacrylonitrile (PAN) chain was formed on the crystalline carbon surface according to the chemical polymerization.

XPS Analysis

Figure 4:
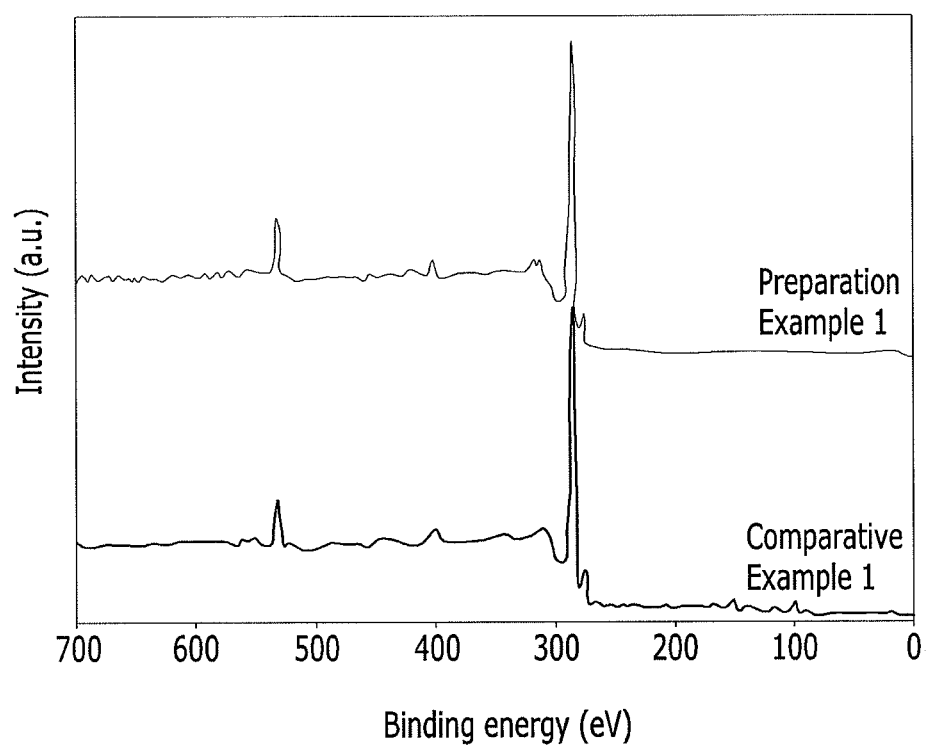
FIG. 4 illustrates a graph showing XPS (X-ray photoelectron spectroscopy) survey spectra of the support obtained from Comparative Example 1 and the support precursor obtained from Preparation Example 1.

The support obtained from the Comparative Example 1 and the support precursor obtained from Preparation Example 1 were analyzed by X-ray photoelectron spectroscopy (XPS), and the results are shown in FIG. 4. As shown in FIG. 4, in addition to a C1s (about 285 eV) signal and an O1s (about 532 eV) signal, a N1s (about 399 eV) signal was also observed. From the results, it may be determined that the PAN coating layer introduced by the chemical polymerization was formed on the surface of crystalline carbon.

Figure 5:
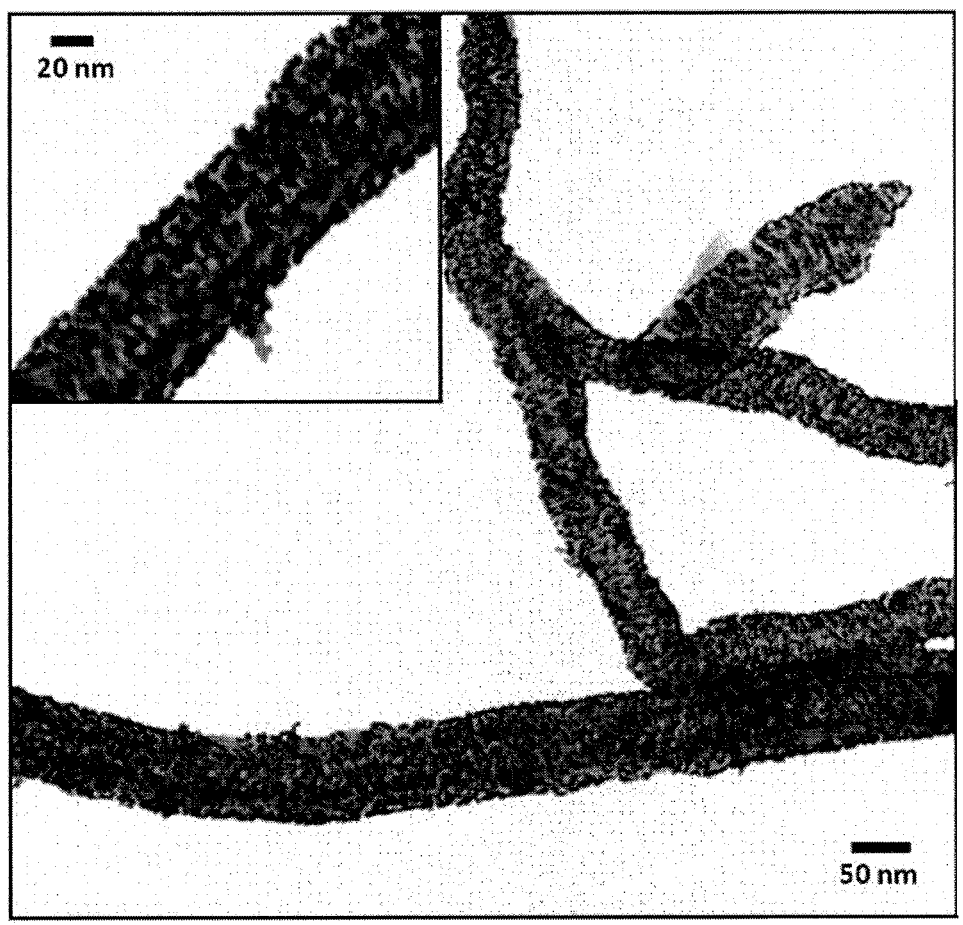
FIG. 5 illustrates a high-resolution transmission electron microscope (HR-TEM) photograph of the catalyst obtained by supporting Pt nanoparticles in the support obtained from Example 2.
Figure 6:
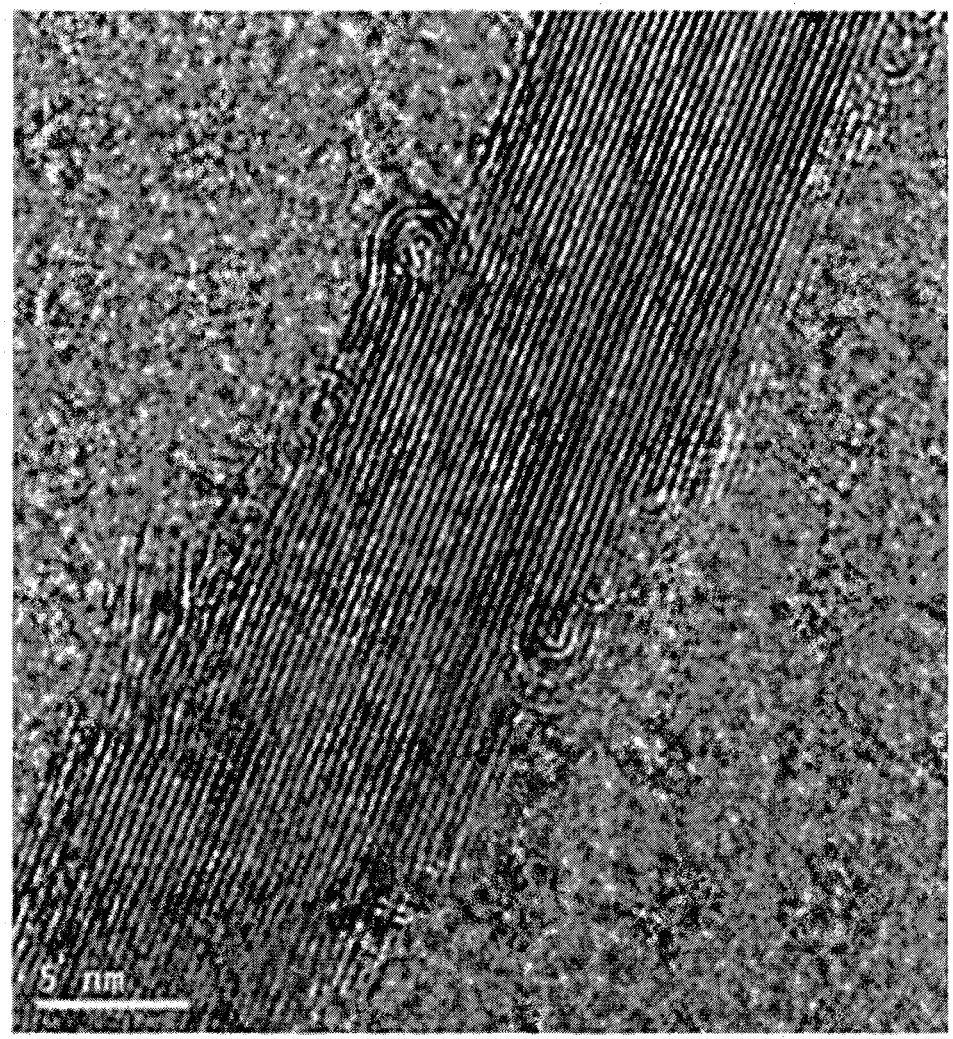
FIG. 6 illustrates a high-resolution transmission electron microscope (HR-TEM) photograph of the support obtained from Example 2.

A Pt nanoparticle was supported on the support obtained from Example 2 to provide a catalyst. The catalyst was imaged by HR (high resolution)-TEM, and the results are shown in FIG. 5. From the results shown in FIG. 5, it may be seen that the Pt nano particles were uniformly supported on the support. In addition, FIG. 6 shows an HR-TEM image of the support obtained from Example 2. As shown in FIG. 6, it may be seen that the obtained support had a structure of a substrate and a crystalline carbon layer disposed on the substrate.

COMPARATIVE EXAMPLE 4

A catalyst for a fuel cell was fabricated by supporting Pt on the support obtained from Comparative Example 1 according to the chemical reduction.

COMPARATIVE EXAMPLE 5

A catalyst for a fuel cell was fabricated by supporting Pt on the support obtained from Comparative Example 2 according to the chemical reduction.

EXAMPLE 3

A catalyst for a fuel cell was fabricated by supporting Pt on the support obtained from Example 1 according to the chemical reduction.

EXAMPLE 4

A catalyst for a fuel cell was fabricated by supporting Pt on the support obtained from Example 2 according to the chemical reduction.

COMPARATIVE EXAMPLE 6

A catalyst (Pt/CNT) for a fuel cell was fabricated by supporting Pt on a carbon nanotube support formed with no carbon layer according to the chemical reduction.

Figure 7:
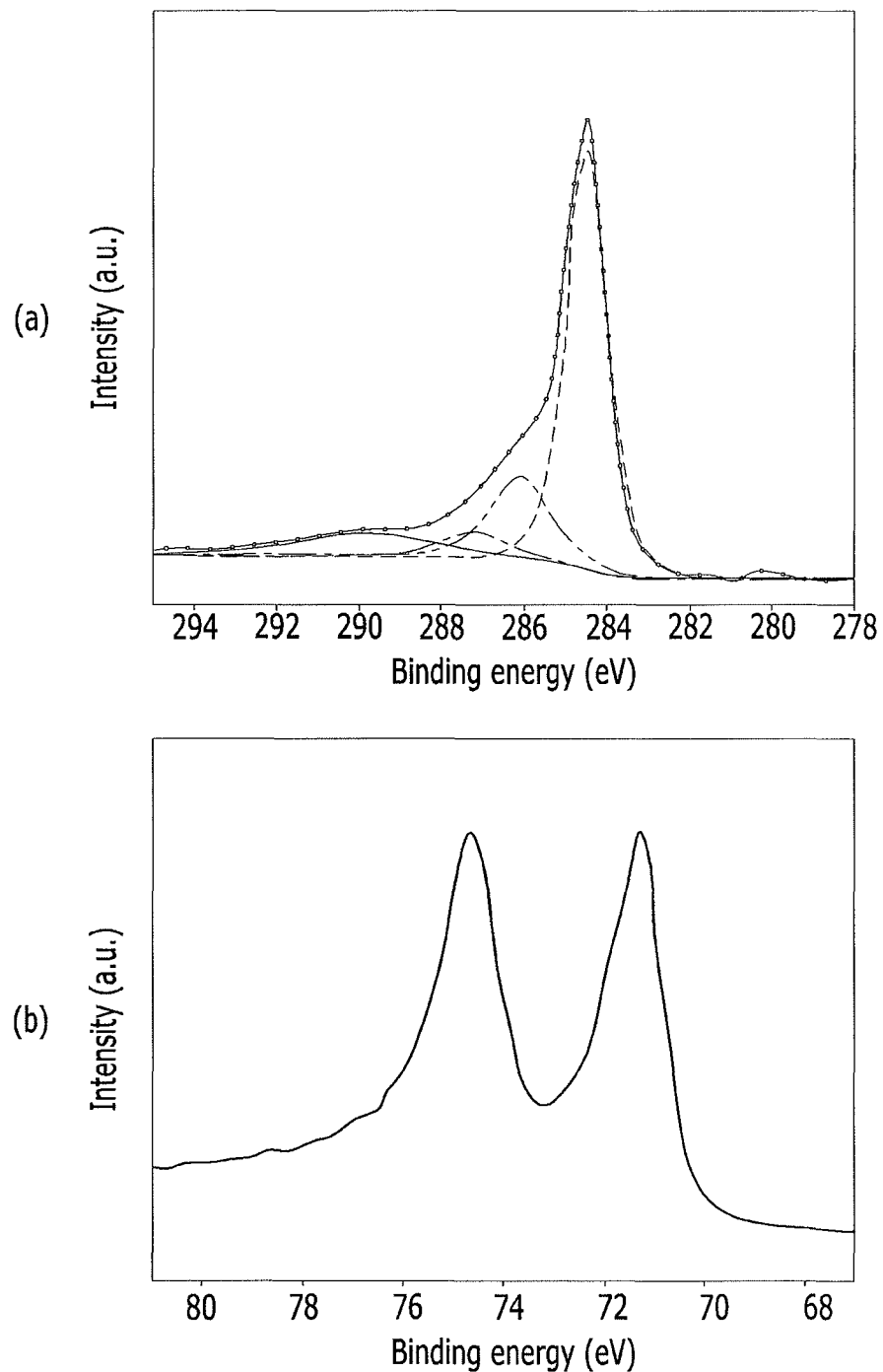
FIG. 7 illustrates a graph showing XPS C1s core-level spectra of the carbon support obtained from Example 1 (a)

The carbon support obtained from Example 1 was analyzed by high resolution XPS C1s core-level spectroscopy, and the results are shown in (a) of FIG. 7. In addition, the catalyst obtained from Example 3 was measured by high resolution XPS Pt4f core-level spectroscopy, and the results are shown in (b) of FIG. 7. As shown in (a) and (b) of FIG. 7, it may be determined that, in the catalyst obtained from Example 3, Pt nanoparticle was uniformly supported on the support including a high crystalline carbon graphitized layer.

Electrochemical Characteristic Evaluation 0.25 mg/cm$^2$ of each catalyst obtained from Examples 3, 4 and Comparative Examples 4 to 6 was added to a solvent including water mixed with dipropylene glycol at a weight ratio of 50:50. An ionomer of 5 wt % Nafion (Dupont) was added to provide a catalyst composition for an electrode.

Figure 8:
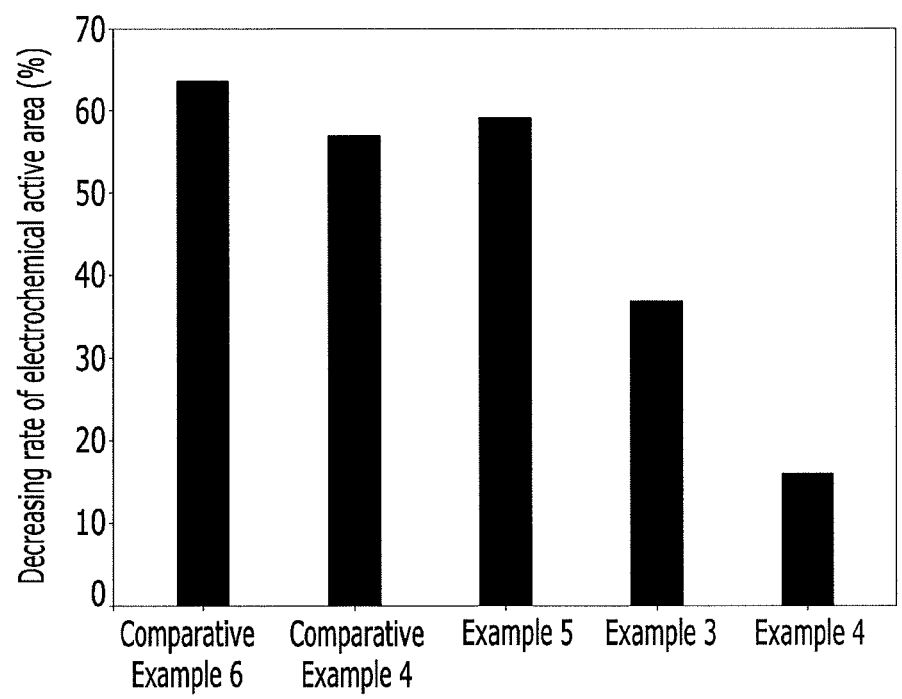
FIG. 8 illustrates a graph showing a decreasing rate of electrochemical active area of a half cell obtained using the catalysts obtained from Examples 3, 4 and Comparative Examples 4 to 6.

The ionomer was included in an amount of 40 wt % based on the total amount of the ionomer and catalyst. The catalyst composition was coated onto a glassy carbon electrode to provide a half-cell electrode for cyclic voltammetry (CV). Cyclic voltammetry (CV) was carried out with respect to the half-cell, and the decreasing rate of an electrochemical active surface area (ECSA) was measured. The decreasing ratio of the electrochemical active surface area after carrying out the CV compared to the initial electrochemical active surface area before carrying out the CV was calculated in terms of a percentage (%), and the results are shown in FIG. 8. The CV test was performed by using a potentiostat (VSP, Bio-Logic SA), and a rotation control (Pine) in a setup of a temperature controller standard three-compartment electrode. In this case, a Pt-mesh electrode and an Ag/AgCl electrode were used as a counter electrode and a reference electrode, respectively. The electrochemical active surface area was calculated as the average of the peak area of hydrogen adsorption and desorption excepting the double layer charge values. Using an $N_2$-saturated 0.1M $HClO_4$ solution, cycles were repeated at 0.6V to 1.4V for 1000 times, and ECSA was measured in each 100 cycles at a scan rate of 20 mW/s.

As shown in FIG. 8, the decreasing ratio of electrochemical active surface area of Examples 3 and 4 was less than that of Comparative Examples 4 to 6. Particularly, it may be determined that, in the case of Example 4, the electrochemical active surface area barely decreased.

Figure 9:
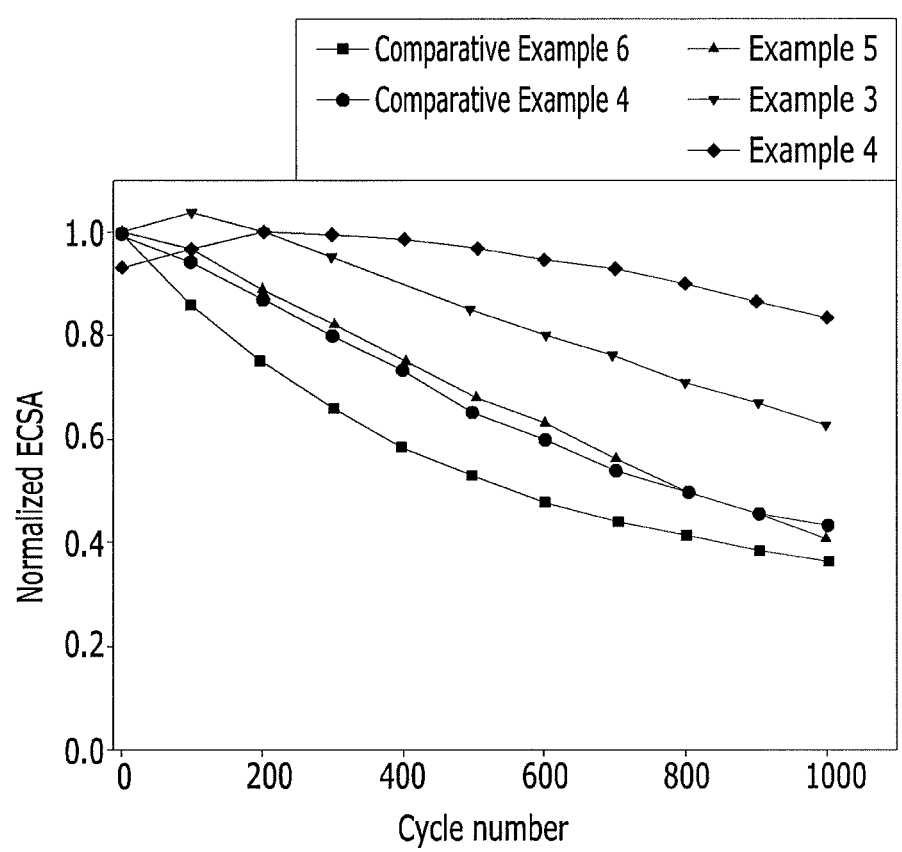
FIG. 9 illustrates a graph showing an electrochemical surface area of a half cell obtained using the catalysts obtained from Examples 3, 4 and Comparative Examples 4 to 6.

In addition, the half-cell was measured with respect to electrochemical surface area, and the results are shown in FIG. 9. As shown in FIG. 9, it may be determined that the catalysts of Examples 3 and 4 had a significantly smaller decreasing ratio of electrochemical surface area than the catalysts of Comparative Examples 4 to 6. Particularly, it may be determined that the electrochemical surface area was barely decreased even after the 1000th cycle in Example 4. Accordingly, it may be estimated that the catalysts of Examples 3 and 4 had superior electrochemical stability and durability to those of Comparative Examples 4 to 6.

Measuring Raman Spectrum

Figure 10:
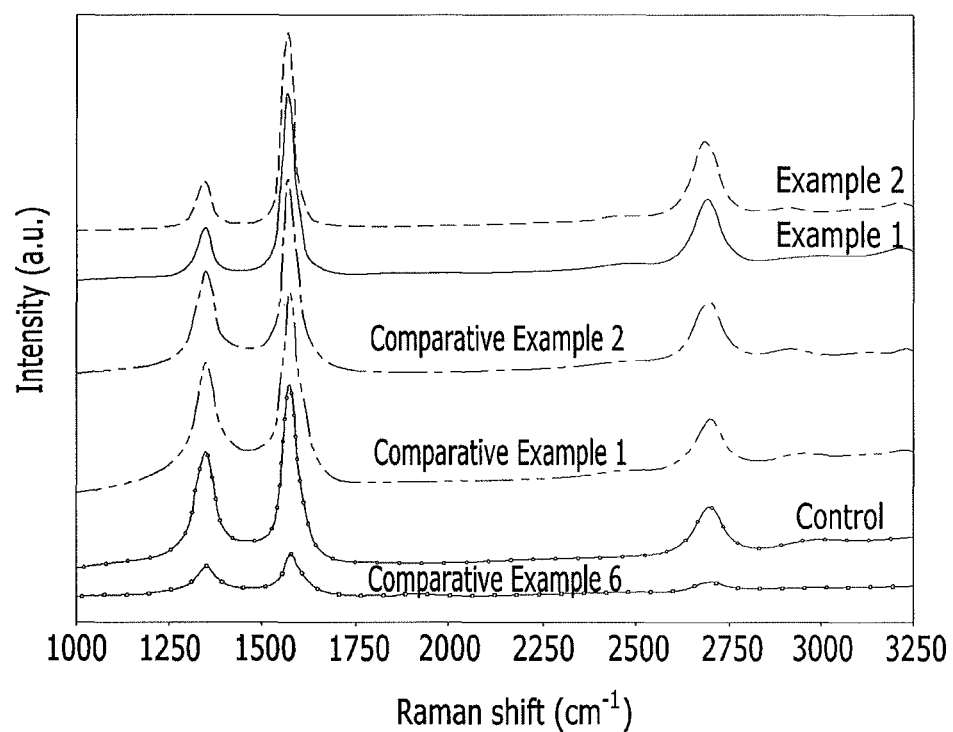
FIG. 10 illustrates a graph showing a Raman spectrum of the supports obtained from Examples 1 and 2 and Comparative Examples 1, 2 and the catalysts obtained from Comparative Example 6 and a Control.

The supports obtained from Examples 1 and 2 and Comparative Examples 1 and 2 were analyzed by Raman spectroscopy, and the results are shown in FIG. 10. For the comparison, the catalyst according to Comparative Example 6 and a Control including only CNT were measured for Raman spectrum, and the results are also shown in FIG. 10. As shown in FIG. 10, the similar results are shown in all of Examples 1 and 2 and Comparative Examples 1, 2, 6, and CNT, so it may be determined that the support according to Examples 1 and 2 maintained a similar structure to those of the conventional supports.

Measuring Raman Spectrum Intensity Ratio

Figure 11:
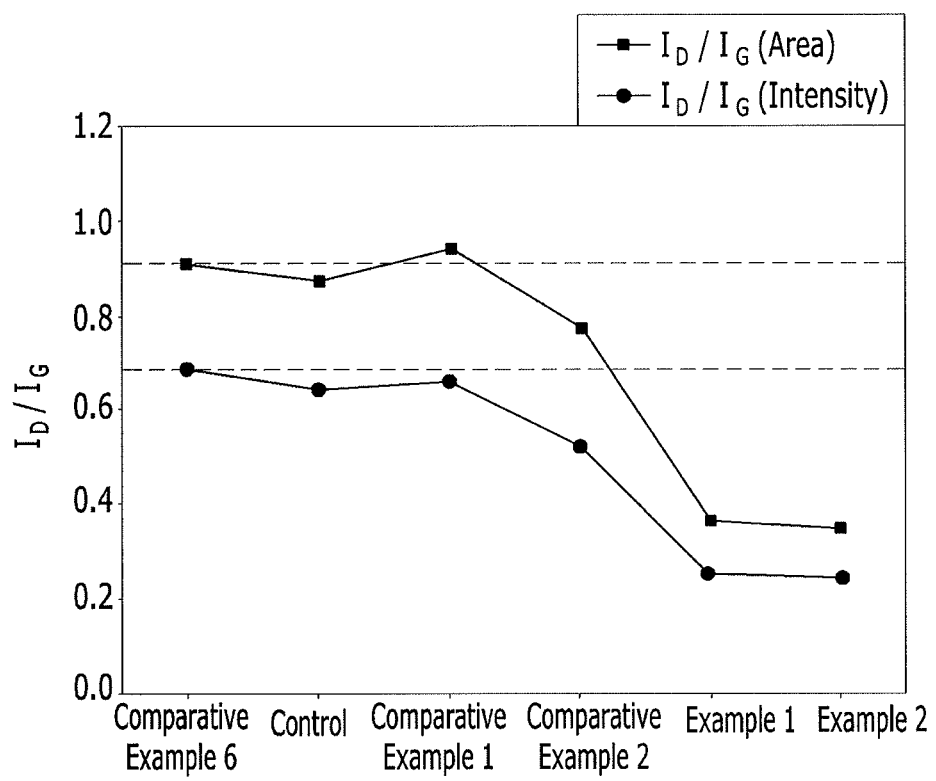
FIG. 11 illustrates a graph showing the Raman spectrum area ratio and intensity ratio of supports obtained from Examples 1 to 2 and Comparative Examples 1, 2 and the catalysts obtained from Comparative Example 6 and a Control.

The supports of Examples 1 and 2 to Comparative Examples 1 and 2, and, for the comparison, the catalyst obtained from Comparative Example 6 and the Control of CNT were measured to determine a Raman spectrum area ratio (area integral ratio) and an intensity ratio at a (1580 $cm^{-1}$) plane and (1360 $cm^{-1}$) plane. From these measurements, the $I_D/I_G$ area ratio (area (1360 $cm^{-1}$)/area (1580 $cm^{-1}$)) and the ID/IG intensity ratio (intensity (1360 $cm^{-1}$)/intensity (1580 $cm^{-1}$)) were calculated. The results are shown in FIG. 11. From the results shown in FIG. 11, it may be confirmed that the catalyst of Comparative Example 6 had a $I_D/I_G$ area ratio of about 0.91, a $I_D/I_G$ intensity ratio of about 0.69; and the catalysts of Control and Comparative Examples 1 and 2 had a $I_D/I_G$ area ratio of about 0.78 to about 0.93, a $I_D/I_G$ intensity ratio of about 0.53 to about 0.65.

On the other hand, the catalysts of Examples 1 to 2 had a $I_D/I_G$ area ratio of about 0.35, a $I_D/I_G$ intensity ratio of about 0.24. According to the results, the supports according to Examples 1 to 2 had a different Raman spectrum area ratio and intensity ratio from those of Comparative Examples 1, 2, 6 and the Control. In addition, it may be determined that the supports according to Examples 1 to 2 had a $I_D/I_G$ area ratio of about 38%, a $I_D/I_G$ intensity ratio of about 35% relative to the catalyst according to Comparative Example 6.

By way of summation and review, embodiments provide a support for a fuel cell being capable of improving catalyst activity. Embodiments provide a method of preparing the support for a fuel cell. Embodiments provide an electrode for a fuel cell including the support for a fuel cell. Embodiments provide a membrane-electrode assembly for a fuel cell including the electrode. Embodiments provide a fuel cell system including the membrane-electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An electrode for a fuel cell, the electrode comprising:
   an electrode substrate including a carbon paper, a carbon cloth, a carbon felt, or a metal cloth; and
   a catalyst layer on the electrode substrate, the catalyst layer including a catalyst and a binder resin,
   wherein:
   the catalyst includes a support and an active metal supported on the support,
   the support includes a carbon substrate and a graphitic layer covering a surface of the carbon substrate;
   the carbon substrate is a carbon nanotube, a carbon nanowire, or a heat-treated carbon black;
   the graphitic layer includes graphene sheets stacked together and has mesopore channels therein aligned with the graphene sheets; and
   the active metal is supported on, and directly contacts, the graphitic layer.

2. The electrode for a fuel cell as claimed in claim 1, wherein the graphitic layer has a layer thickness of about 1 nm to about 40 nm.

3. The electrode for a fuel cell as claimed in claim 1, wherein the active metal includes platinum, ruthenium, osmium, a platinum-ruthenium alloy, a platinum-osmium alloy, a platinum-palladium alloy, or a platinum-M alloy, wherein M is at least one transition element selected from Ga, Ti, V, Cr, Mn, Fe, Co, Ni, Cu, Zn, Sn, Mo, W, Rh, and Ru.

4. A membrane-electrode assembly for a fuel cell, the membrane-electrode assembly comprising
   a cathode and an anode facing each other and a polymer electrolyte-membrane between the cathode and anode,
   wherein at least one of the cathode and anode is the electrode according to claim 1.

5. A fuel cell system, comprising
at least one electricity generating element including the membrane-electrode assembly according to claim 4 and a separator positioned at each side of the membrane-electrode assembly;
a fuel supplier that supplies the electricity generating element with a fuel; and
an oxidant supplier that supplies the electricity generating element with an oxidant.

6. The electrode for a fuel cell as claimed in claim 1, wherein the graphitic layer is a layer obtained by stabilization, carbonization, and graphitization of a graphitizable polymer coated on the carbon substrate.

7. The electrode for a fuel cell as claimed in claim 6, wherein the graphitizable polymer is polyacrylonitrile (PAN).

8. The electrode for a fuel cell as claimed in claim 1, wherein the graphitic layer has a structure of the continuous coating of crystalline carbon on the carbon substrate as obtained by adding a monomer for a graphitizable polymer to a liquid containing a highly crystalline carbon suspended therein to prepare a mixture, adding a polymerization initiator to the mixture to perform polymerization and prepare a polymerization product, stabilizing the polymerization product to prepare a stabilized product, first heat-treating the stabilized product to provide a first heat-treated product, second heat-treating and carbonizing the first heat-treated product to provide a resultant, and third heat-treating and graphitizing the resultant.

\* \* \* \* \*